United States Patent [19]
Heier et al.

[11] Patent Number: 5,868,625
[45] Date of Patent: *Feb. 9, 1999

[54] BIPODE JOINT

[75] Inventors: Dieter Heier, Gelsenkirchen; Wilfried Gille, Dorsten, both of Germany

[73] Assignee: GKN Gelenkwellenbau GmbH, Essen, Germany

[*] Notice: The term of this patent shall not extend beyond the expiration date of Pat. No. 5,820,468.

[21] Appl. No.: 819,498

[22] Filed: Mar. 17, 1997

[30] Foreign Application Priority Data

Mar. 21, 1996 [DE] Germany ............... 196 11 176.5

[51] Int. Cl.$^6$ ........................................ F16D 3/202
[52] U.S. Cl. ..................... 464/123; 464/132; 464/905
[58] Field of Search .................... 464/111, 120, 464/122, 123, 132, 905

[56] References Cited

U.S. PATENT DOCUMENTS

| | | | |
|---|---|---|---|
| 1,072,612 | 9/1913 | Hermann | 464/132 |
| 1,543,575 | 6/1925 | Kishline . | |
| 1,553,312 | 9/1925 | Garrecht | 464/122 |
| 1,940,779 | 12/1933 | Williams | 464/123 |
| 2,284,198 | 5/1942 | Greiner | 464/123 |
| 2,752,765 | 7/1956 | Wildhaber | 464/123 |
| 2,874,556 | 2/1959 | Kraus | 464/123 |
| 2,891,392 | 6/1959 | Wildhaber | 464/123 |
| 2,906,105 | 9/1959 | De Lorean | 464/123 |
| 2,914,930 | 12/1959 | Wildhaber | 464/123 |
| 2,984,997 | 5/1961 | Wight | 464/905 |
| 3,008,311 | 11/1961 | Mazziotti | 464/123 |
| 3,204,427 | 9/1965 | Dunn . | |
| 3,748,869 | 7/1973 | Orain | 464/132 |

FOREIGN PATENT DOCUMENTS

| | | |
|---|---|---|
| 1830662 | 1/1959 | Germany . |
| 1838914 | 12/1960 | Germany . |
| 25 30 670 A1 | 1/1976 | Germany . |
| 188382 | 3/1937 | Sweden ............ 464/123 |
| 1003513 | 9/1965 | United Kingdom . |
| WO 95/11390 | 4/1995 | WIPO . |

OTHER PUBLICATIONS

Book by F. Schmelz, H.-Ch. Graf von Seherr-Thoss and E. Aucktor "Gelenke und Gelenkwellen" (Joints ad jointed shafts), Konstruktionsbücher, vol. 36, published by Professor D.-Ing. G. Pahl, Springer-Verlag 1988, p. 152, Figure 4.35.

*Primary Examiner*—Eileen Dunn Lillis
*Attorney, Agent, or Firm*—Harness, Dickey & Pierce, P.L.C.

[57] ABSTRACT

A bipode joint for small articulation angles and high torque transmission has a first joint part (1) and a second joint part (23). Two rollers (7, 8) are rotatably supported on arms (3) of the first joint part (1). The rollers (7, 8) engage apertures (27) which extend from a cavity (24) to the outer face of the second joint part (23). To assemble the first joint part (1) with arms (3), recesses (32) are provided which enable the first joint part (1) to be threaded in. Thus, it is possible to associate the running faces which cooperate with the rollers (7, 8) with the apertures in the second joint part, thus, overall achieving a stable embodiment for high torque transmission.

10 Claims, 3 Drawing Sheets

BIPODE JOINT

BACKGROUND OF THE INVENTION

The invention relates to a bipode joint with a first joint part which defines a first longitudinal axis. Two arms extend from the first joint part at a right angle relative to the first longitudinal axis. The axes are positioned in a plane containing the first longitudinal axis. Rollers are supported on the arms. A second joint part has a second longitudinal axis and includes a central cavity to accommodate the first joint part. The second joint part has two opposed tracks which are open towards the cavity and extend parallel to the second longitudinal axis. The first joint part includes a first connecting means and the second joint part a second connecting means.

A bipode joint is illustrated, for example, in the book by F. Schmelz, H.-Ch. Graf von Seherr-Thoss and E. Aucktor "Gelenke und Gelenkwellen" (Joints and jointed shafts"), Konstruktionsbücher, Volume 36, published by Professor Dr.-Ing. G. Pahl, Springer-Verlag 1988, page 152, FIG. 4.35. In this embodiment, the rollers have a spherical surface whose diameter is centered on the arm axis. The tracks are cylindrical. The arms are associated with sliding blocks to provide support in the direction of the arm axis on the second joint part. The blocks outer face is spherical and, together with one arm, are inserted into bores in the end faces of the arms. The second joint part is open at its end face, thus permitting the first joint part, together with the arms, rollers and sliding blocks, to be slid into the second joint part from the end face of same. This design leads to a relatively large diameter with respect to the torque which it transmits.

SUMMARY OF THE INVENTION

It is an object of the invention to provide a bipode joint with a high torque transmitting capacity and at the same time permit a small rotational circle.

In accordance with the invention, tracks are formed by planar running faces which extend parallel relative to one another and to the second longitudinal axis. The running faces serve to support cylindrical outer faces of the rollers. The running faces form part of the two apertures between the outer face of the second joint part and its cavity. The second joint part, starting from its open end face, includes a recess which corresponds to at least one of the two apertures. The recess extends from the end face to the aperture. Also, the apertures, in the direction of the second longitudinal axis, starting from the planar running faces, are delimited on both sides by wall faces which extend towards each other.

The apertures reduce the strength of the second joint part only slightly, so that the torque transmitting capacity is not adversely affected. The recesses enable the first joint part to be assembled with the arms. The recesses are used to receive the arms when the first joint part is progressively introduced with the arms. In the course of assembly, the arm threaded in first is able to project through the aperture outwardly from the second joint part. This enables the second arm to be threaded into the first joint part through the recess into the second aperture. Furthermore, as compared to universal joints, this design is advantageous since only two bearings are required. Overall, it is possible to achieve larger arm diameters so that, even with the same rotational diameter, higher torque values can be transmitted in comparison to universal joints. It is also possible to achieve the necessary articulation angles such as they are required for joints used in rolling mills. In such applications, only one end compensates for relatively small angular deviations. However, what is required is a compact design which transmits high torques. This is ensured by bipode joints in accordance with the invention.

It is possible to provide the bipode joint in the form of a plunging joint or a fixed joint. As joints used in rolling mills additionally require a plunging element between the joints, it is advisable to provide the bipode joint in the form of a fixed joint.

In a further embodiment of the invention, stop elements are provided to limit axial movement of the first joint part relative to the second joint part. The stop element which limits the movement of the rollers of the first joint part in the direction of the end face of the second joint part, from which the cavity starts, includes a ring with a stop face. The second stop face is preferably also formed by a ring. The second stop faces can be arranged in such a way to enable a limited axial displacement or only an angular movement. Finally, it is proposed that the ring or the rings is/are accommodated in a recess of the second joint part or in a holding ring which is secured to the second joint part.

In another advantageous embodiment, each arm is associated with two rollers. A first roller and a second roller each include cylindrical outer faces with different diameters. The second roller, at its end face removed from the first longitudinal axis, additionally includes a spherical zone. The spherical zone takes on the centering function in the radial direction. The stop face of the ring is designed as a hollow spherical zone with a radius which corresponds to the spherical zone. The supporting face is followed by second planar faces for the second roller.

Another advantage is to reduce the amount of friction during articulation. Friction is reduced because the two rollers are able to rotate independently of one another. Overall, a compact design is achieved.

It is possible to use a considerable part of the arm length for torque transmitting purposes. The stepped diameter assembly is possible even if the second joint part has a compact design. This is due to the first joint part having a smaller diameter which can be threaded in first before the region with the larger diameter. Furthermore, it is possible for the second roller to be fitted on the arm and only the roller with the smaller diameter is slid on to the arm subsequently from the outside through the aperture.

To achieve as short a unit as possible, the length of the first and second running faces is calculated on the basis of the axial displacement path resulting at the maximum articulation of the first joint part relative to the second joint part. The first joint part is prevented from any axial displacement relative to the second joint part by the contact faces of the rings. The other wall regions of the apertures can be contact-free. An advantage to this is that only relatively short faces have to be machined and hardened.

If the bipode joint is provided in the form of a fixed joint, the rings perform centering functions and receive the axial forces. As there are faces available for accommodating the loads, the surface pressure is reduced.

In cases where the bipode joint is provided in the form of a plunging joint, additionally towards the second longitudinal axis, in the region adjoining the first planar running faces, the apertures include supporting faces. The supporting faces are in the form of cylindrical partial faces. The cylinder axis is centered on the second longitudinal axis. The cylinder radius corresponds to that of the spherical zone of the second roller.

Furthermore, the second joint part includes a seat face which starts from its end face towards the open cavity. The seat face serves to accommodate the ring of the holding ring. The ring is held by a securing element to prevent any axial displacement towards the end face. To limit the movement in the sense of shortening and securing the first joint part relative to the second joint part, the second joint part, at the end facing away from the first ring, at the end of the cavity removed from the end face, includes a recess which serves to receive the second ring. The ring includes a hollow spherical zone which constitutes a contact face for the spherical zone of the second roller.

A sleeve is provided to seal the second joint part in a leakproof way. The sleeve is slid onto the outer face of the second joint part from the end face. The sleeve covers the apertures. As the sleeve does not have to accommodate any forces, it can be provided in the form of a relatively thin-walled tube.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention and the assembly of the first joint part relative to the second joint part are diagrammatically illustrated in the drawing wherein.

DETAILED DESCRIPTION OF THE DRAWINGS

Figure 1:
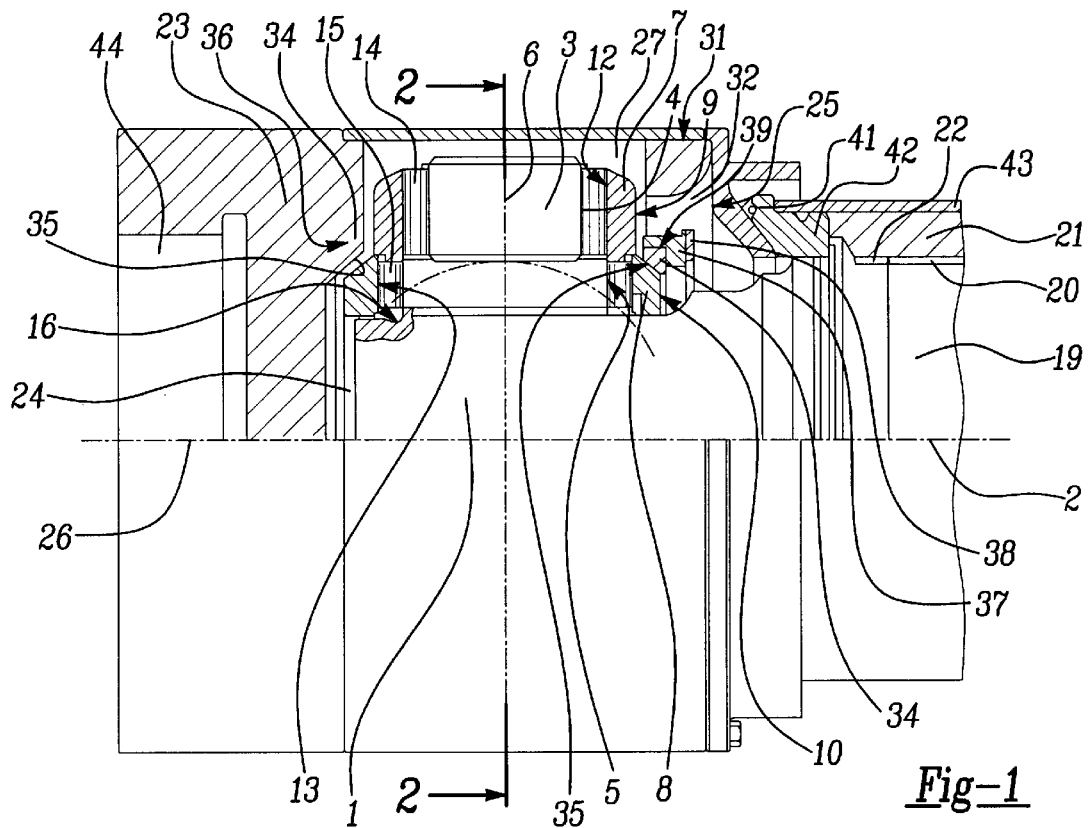
FIG. 1 is a partial cross sectional side view of the joint.
Figure 2:
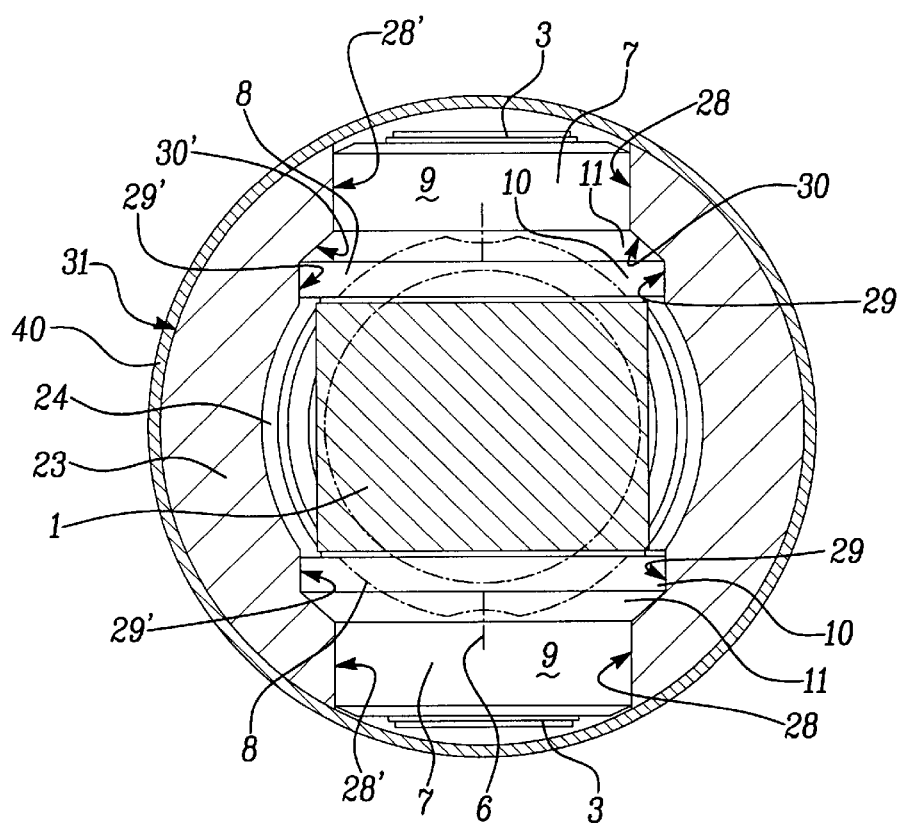
FIG. 2 is a section view of FIG. 1 along line II—II thereof.
Figure 3:
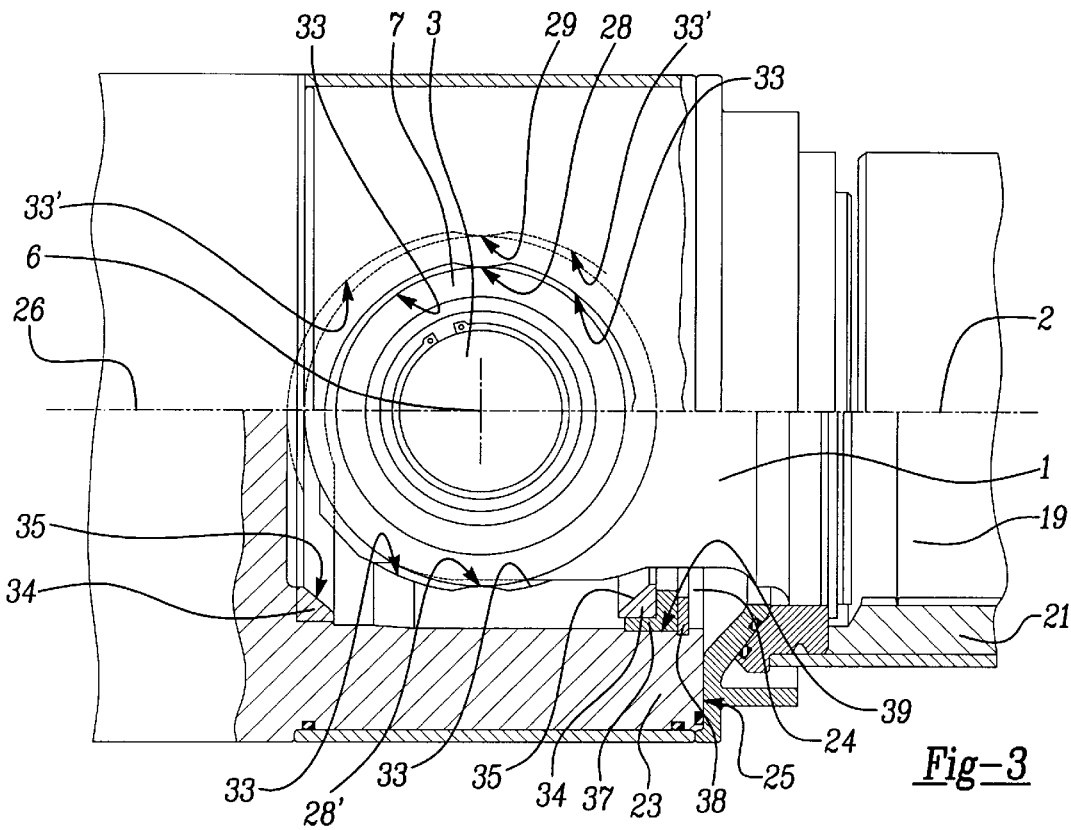
FIG. 3 is a partial cross sectional view according to FIG. 1.

The joint illustrated in FIGS. 1 to 4 is in the form of a fixed joint, which means the two joint parts only carry out angular movements relative to one another.

The first joint part 1 includes a first longitudinal axis 2 and arms 3. The arms 3 extend in a plane containing the first longitudinal axis 2. Thus, the arms 3 extend at a right angle relative to the first longitudinal axis 2. The two arms 3 define a common arm axis 6.

The two arms 3 have cylindrical bearing faces 4, 5 each defined with a stepped diameter. The first bearing face 4, which starts from the end face of the arm 3, includes a diameter which is smaller than the bearing face 5. The bearing face 5 follows bearing face 4 in the direction towards the first longitudinal axis 2.

The first bearing face 4 carries a first roller 7. A rolling contact member 14 is arranged in the annular gap between the roller bore 12 and the cylindrical outer face 4 of the arm 3. The rolling contact member 14 is rotatably supported on the first bearing face 4. The first roller 7 partially covers the end face of a second roller 8. The second roller 8 is supported on the larger diameter bearing face 5. Intermediate rolling contact members 15 are arranged between the roller bore 13 and the bearing face 5. The second roller 8, by end face closest to the longitudinal axis 2, is supported against a supporting face 16 of the first joint part 1. The roller is either directly, as illustrated, or with a bearing arranged therebetween indirectly supported on the supporting face 16.

The two rollers 7, 8 are held by a securing disc 17. The disc 17 covers at least partially the free end face of the first roller 7. The first roller 7, which rests against the rolling contact members 15 relative to the arm 3, is secured by a first securing ring 18 and a second further securing ring, radially inward of said roller 7, with a disc arranged therebetween.

The first roller 7 includes a cylindrical outer face 9 with a diameter smaller than that of the cylindrical outer face 10 of the second roller 8. The end face of the second roller 8, which points to the first roller 7, includes a spherical zone 11. The radius of the spherical zone 11 is centered on the first longitudinal axis 2 of the first joint part 1. Furthermore, the first joint part 1 has a connecting journal 19 with teeth 20. The teeth extend parallel to the first longitudinal axis 2. The teeth 20 of the connecting journal 19 engage teeth 22 of a sliding sleeve 21. A further bipode joint in accordance with the invention, for example, can be arranged at the other end of the sliding sleeve 21.

The second joint part 23 defines a second longitudinal axis 26. A cavity 24 starts from the end face 25 and extends over a certain length along the second longitudinal axis 26. The wall existing between the outer face 31 of the second joint part 23 and the cavity 24 includes diametrically opposed apertures 27. The apertures 27, at their centers, with reference to their extension along the second longitudinal axis 26, include first planar running faces 28, 28'. The first planar running faces 28, 28' also extend parallel relative to one another and parallel to the second longitudinal axis 26, guide the outer face 9 of the first roller. A supporting face 30, 30' each follows the first running faces 28, 28' inwardly, towards the second longitudinal axis 26. The supporting faces 30, 30' are partial cylindrical faces, with the axis of the cylinder centered on the second longitudinal axis 26. The radius of the cylinder corresponds to the radius of the spherical zone 11.

Two supporting faces 30, 30' each follows second running face 29, 29' towards the second longitudinal axis 26 of the second joint part 23. The two second running faces 29, 29' are planar faces and extend parallel relative to one another and parallel to the second longitudinal axis 26. Thus, the second running faces 29, 29' are also parallel to the two running faces 28, 28'. However, in accordance with the greater diameter of the outer face 10 of the second roller 8, the two second running faces 29, 29' are arranged at a greater distance from one another since they guide the second roller 8.

The second roller 8 is supported by its spherical zone 11 on the two supporting faces 30, 30'. The two rollers 8 associated with the first joint part 1, via the spherical zones 11, radially center the first joint part 1 relative to the second joint part 23. The spherical zones 11 of the two second rollers 8 are also used to axially guide and secure the first joint part 1 relative to the second joint part 23.

A ring 34 to guide and secure the first part relative to the second part is arranged on the side close to the end face 25 at the start of the cavity 24. The ring 34 includes a contact face 35 in the form of a hollow spherical zone. The contact face 35 has a spherical radius which corresponds to the spherical zone 11 of the second rollers 8 and is centered on the second longitudinal axis 26.

The ring 34 is accommodated in a recess in a holding ring 37. The holding ring 37, in turn, is guided on a seat face 39 of the second joint part 23 near the end face 25. The holding ring 37 is secured against axial displacement in the direction of the end face 25 by a securing ring 38.

The securing ring 38 engages a corresponding groove in the inner face of the second joint part 23. At the other end, the opposite end, a further ring 34 is provided with a contact face 35 in the form of a hollow spherical zone. The ring 34 is received in a recess 36 of the second joint part 23 at the end of the cavity 24.

The position of the center of the contact face 35 of the ring on the second longitudinal axis 26 corresponds to that of the first ring 34 which is arranged near the end face 25. This measure ensures that the first joint part 1 only carries out angular movements relative to the second joint part 23. The angular movements in the drawing plane lead to a displacement of the two rollers 7, 8 on the running faces 28, 28', 29, 29' and on the supporting faces 30, 30'. In the case of a fixed joint, centering on the contact face 35 of the ring 34 is sufficient, thus it may be possible to eliminate the supporting faces 30, 30', which require expensive machining. The length of the supporting faces 30, 30', if they are provided, is limited to the length resulting from maximum articulations.

The adjoining regions of the wall faces 33 and 33' of the apertures 27 are contact-free, so that no contact exists between the rollers 7, 8. FIG. 1 also shows one of the recesses 32 which starts from the end face 25. It also shows the size of the indentation formed by the recess 32 in the region extending as far as the aperture 27. The outer contour of the holding ring 37 and corresponding seat face 39 constitutes the cross-section of the passage existing relative to the second longitudinal axis 26 in the region outside the recesses. The free space available thereabove can additionally be used for threading in the first joint part 1.

FIG. 1 also shows the second joint part 23 with a coupling sleeve 44. The coupling sleeve 44 can be used, for example, to connect a driven or driving component.

The second joint part 23 is associated with a sealing element 41. The sealing element 41 has a spherical outer face contacted by a hollow spherical face of a cap 42, which is associated with the first joint part 1. The cap 42 carries a protective tube 43 which covers and seals the sleeve 21 when it carries out its sliding movement.

Figure 4:
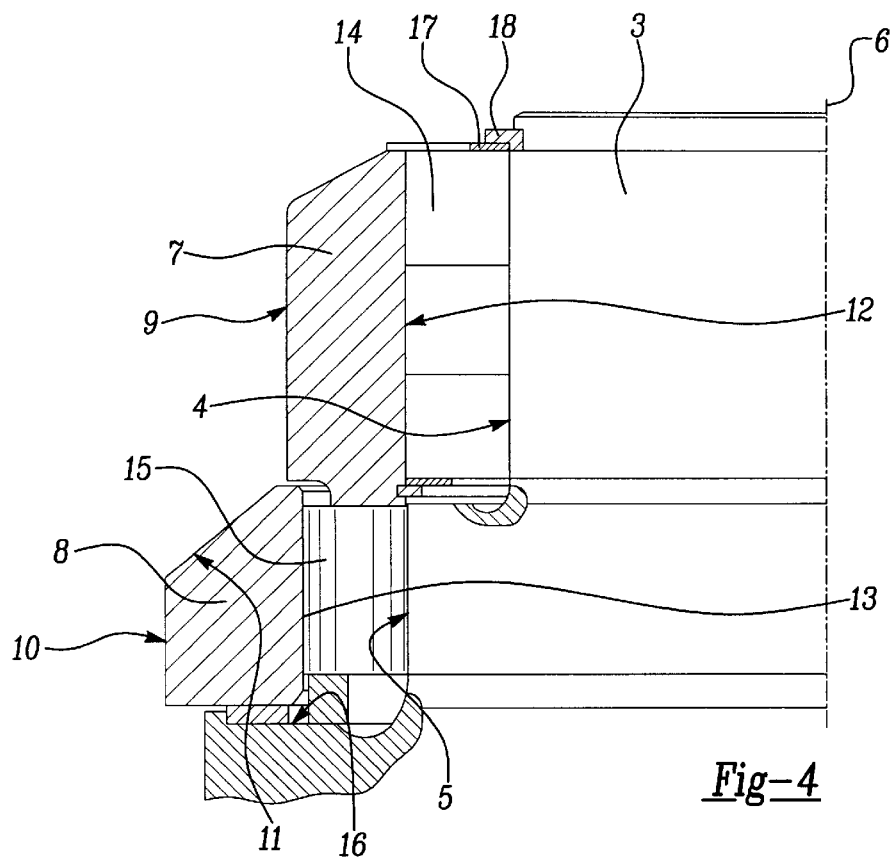
FIG. 4 is an enlarged section view through the bearing means according to FIG. 1.
Figure 5:
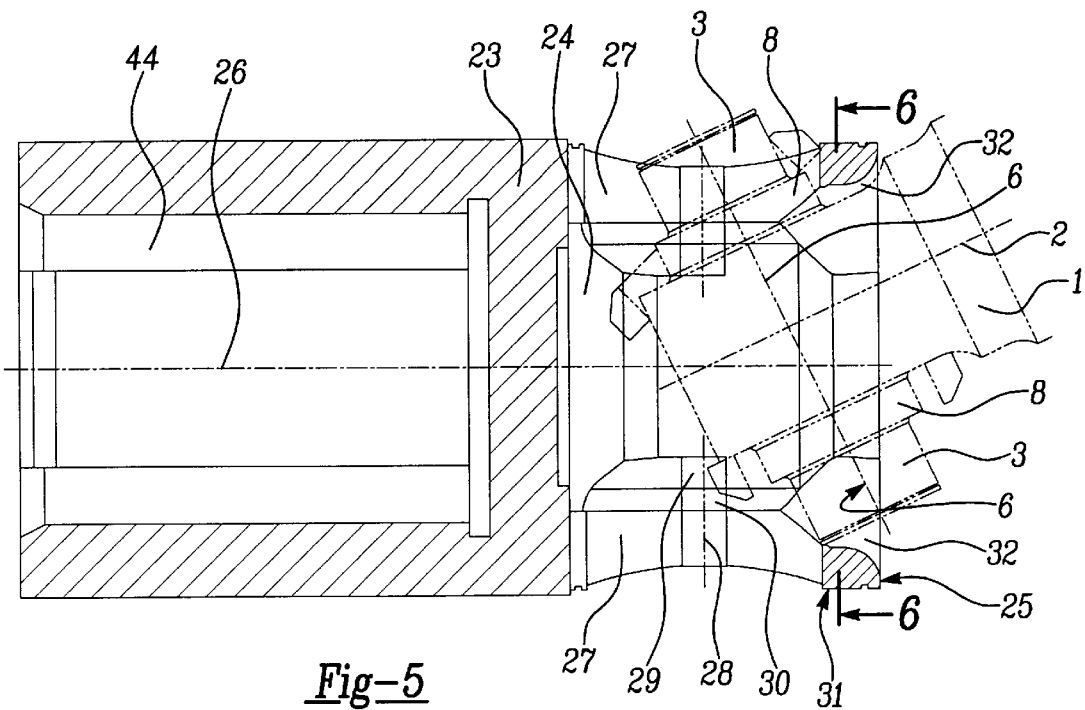
FIG. 5 is a longitudinal section view through the second joint part, showing a first joint part in dash-dotted lines while being threaded into the second joint part.
Figure 6:
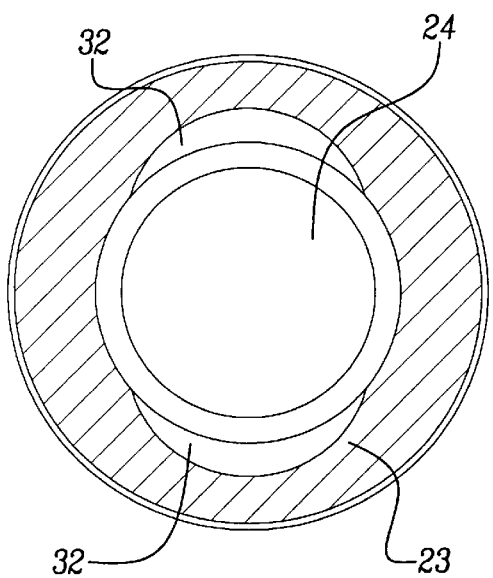
FIG. 6 is a section view of FIG. 5 along line VI—VI thereof.

The design of the first joint part and the way in which it is threaded together are shown in FIGS. 5 and 6. The first joint part 1, together with the second rollers 8 already mounted on the arms 3, by means of the upper arm 3, is first introduced from the end face 25 into the upper aperture 27 by angling the first longitudinal axis relative to the second longitudinal axis 26. In the process, the upper arm 3 passes through the upper recess 32, with the section according to FIG. 5 showing in greater detail the way in which the upper recess 32 extends circumferentially. By the time the position is reached as illustrated in FIG. 4, the lower arm 3 together with the roller 8 has also passed the greatest part of the recess 32. After the first joint part has been lifted up relative to the position according to FIG. 4, and by pivoting the first joint clockwise, the second arm 3 is able to reach the lower aperture 27. Subsequently, the first rollers 7 are slid from the outside through the apertures 27 on to the arms. The rolling contact members are already mounted on the arms. The securing operation follows by means of the securing means. Finally, the sleeve 40 is slid over the second joint part 23 from the end face 25 to cover the apertures.

Figure 7:
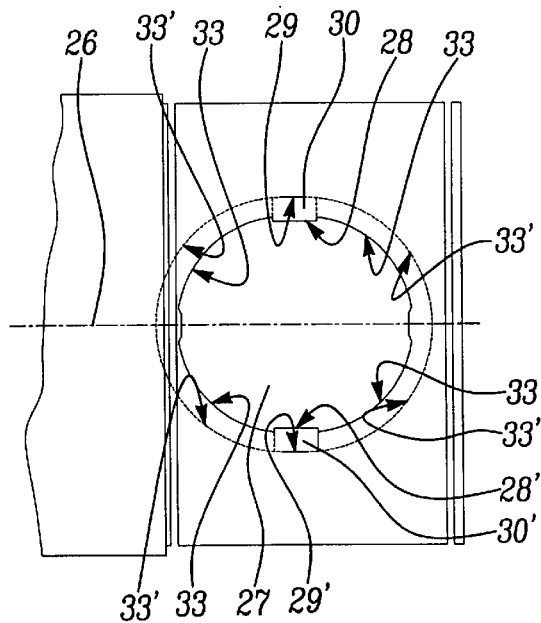
FIG. 7 is a plan view relating to FIG. 5, of the region of the second joint part which includes the aperture.

FIG. 7 again shows the design of an aperture 27. As can be seen, in the direction of the longitudinal axis 26, the two first running faces 28, 28' and the two running faces 29, 29' extend only between the running faces. Supporting faces 30, 30' are arranged in the region adjoining the supporting faces 30, 30'. The walls 33, 33' are set back relative to the first and second running faces 28, 28', 29, 29', so that in this region there is no contact with the rollers 7, 8. Also, as can be seen, the walls 33, 33' extend like quarter circles. Thus, any weakening of the second joint part 23 is as slight as possible bearing in mind the articulation conditions. Overall, it has been possible to achieve a stable embodiment since a full opening towards the end face does not exist. Nevertheless, in view of the existing conditions, it has been possible to provide a relatively large usable arm length to arrange the rollers and, in consequence, to achieve a high torque transmitting capacity relative to the diameter.

While the above detailed description describes the preferred embodiment of the present invention, the invention is susceptible to modification, variation and alteration without deviating from the scope and fair meaning of the subjoined claims.

We claim:

1. A bipode joint comprising:

a first joint part defining a first longitudinal axis having two arms which extend at a right angle relative to the first longitudinal axis, the arm axes of said arms are positioned in a plane containing the first longitudinal axis;

rollers are supported on said arms;

a second joint part defining a second longitudinal axis and central cavity for accommodating the first joint part;

two opposed tracks of said second joint part being open towards the cavity and extending parallel to the second longitudinal axis;

said tracks including planar running faces extending parallel relative to one another and to the second longitudinal axis, said planar running faces supporting the rollers;

two apertures formed through the second joint part between an outer face of the second joint part and the cavity, said two apertures each defining said planar running faces for said rollers;

the second joint part starting from an end face towards which the cavity is open, includes a recess which corresponds to at least one of the two apertures and which extends from the end face to the at least one aperture; and in the direction of the second longitudinal axis, starting from the planar running faces, the apertures are delimited on both sides by wall faces extending towards each other.

2. A bipode joint according to claim 1, wherein axial movement of the first joint part relative to the second joint part is limited by stop elements.

3. A bipode joint according to claim 2, wherein the first stop element limiting movement of the rollers of the first joint part towards the end face of the second joint part from which the cavity starts is formed by a ring which includes a stop face.

4. A bipode joint according to claim 3, wherein the ring is received in a recess of the second joint part or in a holding ring secured to the second joint part.

5. A bipode joint according to claim 3, wherein said rollers on each arm, included a first and second roller, said first roller and second roller include cylindrical outer faces with different diameters and the second roller, at said second roller end face removed from the first longitudinal axis, additionally includes a spherical zone, the stop face of the rings is designed as a hollow spherical zone whose radius corresponds to that of the spherical zone, and a supporting face is followed by second planar running faces for the second roller.

6. A bipode joint according to claim 5, wherein towards the second longitudinal axis, in the region adjoining the first planar running faces, the apertures include supporting faces which are provided in the form of cylindrical partial faces, cylinder axis of the cylinder partial faces is centered on the second longitudinal axis, and radius of the cylindrical partial faces corresponds to that of the spherical zone of the second roller.

7. A bipode joint according to claim 5, wherein at the end of the cavity removed from the end face, the second joint part includes a recess for receiving a second ring provided with a hollow spherical zone constituting the contact face for the spherical zone of the second roller.

8. A bipode joint according to claim 3, wherein the second joint part includes a seat face which starts from the end face towards which the cavity is open, which serves to accommodate the ring and which is held by a securing element to prevent any axial displacement towards the end face.

9. A bipode joint according to claim 1, wherein the length of the first and second planar running faces is calculated on the basis of the axial displacement path resulting from the maximum articulation of the first joint part relative to the second joint part and that the first joint part is prevented from any axial displacement relative to the second joint part by the contact faces of the rings.

10. A bipode joint according to claim 1, wherein the apertures are covered by a sleeve which is slid on to the outer face of the second joint part from the end face towards which the cavity is open.

* * * * *